Dec. 22, 1959 M. BAINBRIDGE 2,917,989
MEANS FOR THE CONTINUOUS PROCESSING OF COMESTIBLES
Filed July 30, 1956 2 Sheets-Sheet 1

MARVIN BAINBRIDGE
INVENTOR.

BY *Lyon & Lyon*

ATTORNEYS

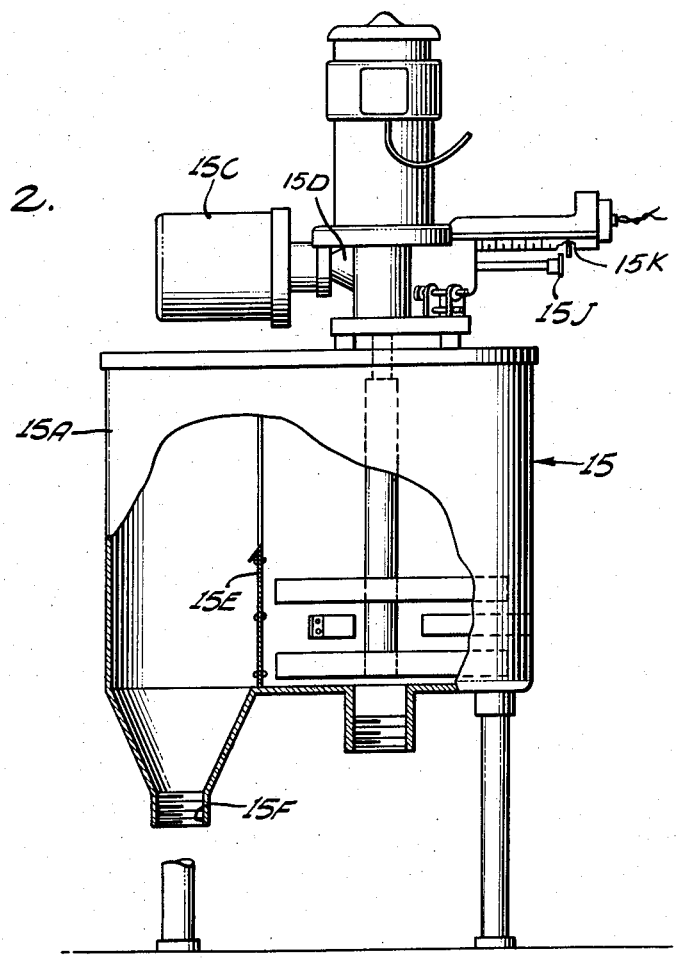
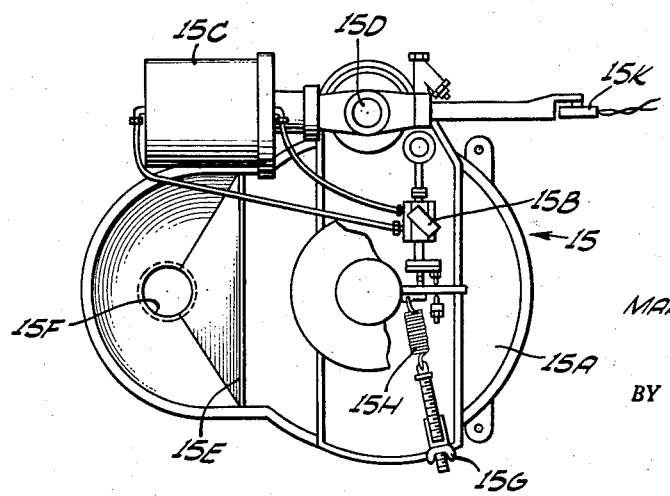

United States Patent Office 2,917,989
Patented Dec. 22, 1959

2,917,989
MEANS FOR THE CONTINUOUS PROCESSING OF COMESTIBLES

Marvin Bainbridge, Kahului, Hawaii, assignor to Maui Pineapple Company, Ltd., Kahului, Maui, Hawaii, a corporation of Hawaii Application July 30, 1956, Serial No. 601,036

7 Claims. (Cl. 99—356)

The present invention relates to the continuous processing of comestibles, and particularly to the continuous processing and canning of crushed pineapple.

In accordance with the prior art, it is the general practice to process crushed pineapple in steam jacketed kettles using a batch process. Such batch process requires considerably more labor and a non-uniform product results in that the drained weights are not uniform even when obtained from the same batch kettle. The inconsistent drained weights are caused by the crushed pineapple solids tending to separate from its packing medium, even with agitation, with the result that the first portion packed from each batch contains more liquid than the final portion.

Even with the most accurate arrangement for manual control, there is a considerable variation in the density of the food products going to the filling machines. This variation is reflected in the sales appeal of the product. The consumer may find one can, when opened, to contain a dense heavy mass, and then find the contents of the next can thin and soupy. In accordance with one feature of the present arrangement, automatic control is provided for controlling the density or viscosity of the comestible going to the filling machines so as to insure a uniform product.

In accordance with the present arrangement, the continuous processing method greatly reduces the labor necessary for the processing operation and results in a much more uniform drained weight pack. This is true even though a so-called holding kettle is included in the new process in which the comestible continuously flows into the holding kettle at the same rate that it flows out, with the result that separation is therefore held to a minimum.

The present arrangement contemplates also an expeditious cooling of comestibles such as, for example, crushed pineapple, tomato paste or other comestibles usually found difficult to cool satisfactorily after canning.

An object of the present invention is to provide improved means and techniques useful in the continuous processing and canning of comestibles.

A specific object of the present invention is to provide improved means and techniques for the continuous processing of crushed pineapple.

Another specific object of the present invention is to provide improved means and techniques for cooling canned comestibles such as crushed pineapple and tomato paste, the satisfactory cooling of which is usually accompanied with difficulty.

Another specific object of the present invention is to provide improved means and techniques for continuous processing of comestibles which demand relatively little labor.

Another specific object of the present invention is to provide improved means and techniques for producing a canned comestible which is uniform in packed weight from can to can.

Another specific object of the present invention is to provide improved means and techniques useful in obtaining proper proportioning of liquid and crushed pineapple in the cans containing the same.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 2 is a view in side elevation of a regulator embodying features of the present invention, with parts broken away to show internal structure.

Figure 3 is a top plan view of the regulator illustrated in Figure 2.

Figure 1:
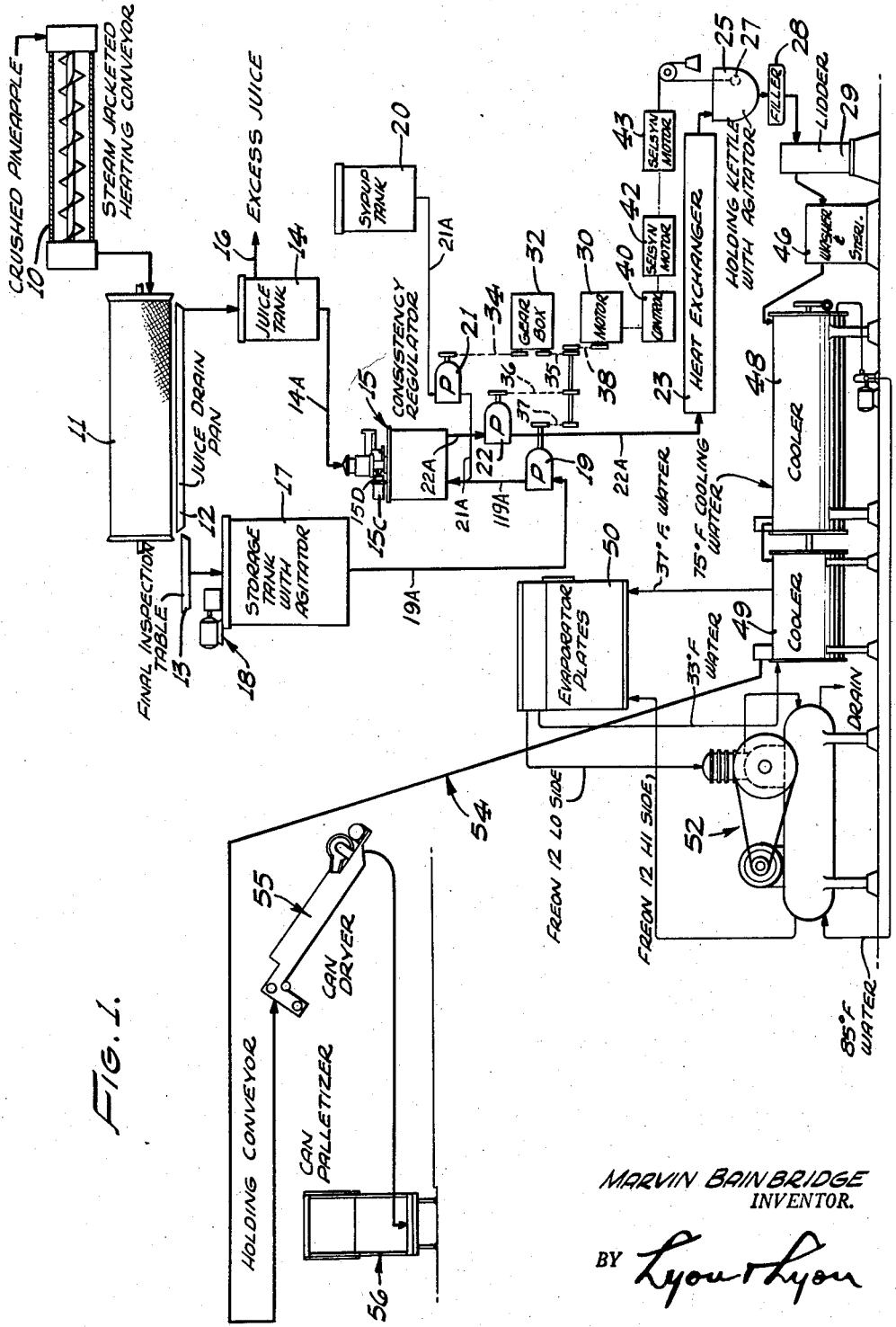
Figure 1 illustrates apparatus for achieving features of the present invention.

The present arrangement involves the obtainance of proper proportioning of liquid and crushed pineapple in all of the cans, and this involves first conveying the crushed pineapple through a steam jacketed screw-type heater 10 into a revolving screen 11 from which juice and solid material is separated, the juice gravitating onto the juice drain pan 12 and solid material collecting on an inspection table 13, at which inspectors, through visual inspection, separate undesirable constituents.

The juice from pan 12 is collected in a juice tank or reservoir 14 from which the juice gravitates into the consistency regulator 15 through fluid line 14A, but the flow of such juice is controlled by the regulator valve 15D as indicated below, the excess juice from the tank 14 being allowed to flow, as indicated by the arrow 16, for other useful purposes.

Solid material, after leaving the inspection table 13, is allowed to gravitate into the storage tank 17 which is provided with motor-driven agitating means 18.

The solid material from the storage tank 17 is delivered to the consistency regulator 15 in metered amounts through the fluid line 19A using the controlled pump 19 in line 19A.

The consistency regulator 15 receives also controlled or metered amounts of syrup from the syrup tank 20 through the fluid line 21A using the controlled pump 21 in line 21A.

The consistency regulator 15 shown in Figures 2 and 3 is a so-called Desurik Automatic Consistency Regulator manufactured by Food Machinery Corp. and includes three agitator paddles rotating in an open top tank 15A and driven by a small motor through reduction gears. The motor with the gearing is not fastened to the base but is carried on its own shaft in ball bearings. With every change in the density of the food or comestible entering the regulator, there is a corresponding change in the power or torque required to turn the agitator. This change in torque is transmitted from a motor frame to a pilot valve 15B. The pilot valve controls the flow of a small quantity of clear water to either end of a hydraulic cylinder 15C to increase or decrease the opening in a dilution liquid control valve 15D. The consistency regulator 15 using the aforementioned clear water in cylinder 15C to control the valve 15D forms, per se, no part of the present invention. Clear water may be used instead of oil or other fluid to control the valve 15D since any leakage of water into the tank will have no detrimental effect. The amount of dilution liquid or juice entering the regulator through the valve 15D is thus automatically adjusted to bring the food mixture to the correct desired density. The food flows out of the regulating chamber over a dam structure 15E and leaves the machine through the outlet 15F at the bottom. When it is desired to change the consistency of the product leaving the regulator, such adjustment may be accomplished by turning a thumbscrew 15G to increase or decrease the tension of a torque spring 15H. An indicator 15J is provided to indicate the amount by which the dilution valve 15D is open; and a switch 15K is provided to turn on a warning light or ring a bell if the density of the incoming food becomes too thin for proper regulation.

The juice, syrup and solid material thus delivered to the consistency regulator 15 are thoroughly mixed therein, and the resulting mixture is delivered in controlled metered amounts through line 22A, using the controlled pump 22 in line 22A, to the double cylinder heat exchanger 23 wherein the mixture is heated.

After heating in the heat exchanger 23, the mixture is delivered to the holding kettle 25, which includes mixture level determining means in the form of a float 27, the float 27, of course, rising and falling with the mixture level in the holding kettle. The mixture in the holding kettle 25 is supplied to open cans at the filler station 28. The filled cans, after leaving the filler station 28, are transferred to the lidder or can closing station 29.

It is noted that the rate at which the mixture enters the holding kettle 25 is substantially equal to the rate at which the mixture leaves the holding kettle 25, this being assured by the float operated mechanism involving float 27, which serves to control the speed of the aforementioned pumps 19, 21 and 22 through a selsyn motor control.

Thus, the three pumps 19, 21 and 22 are each driven by a common motor 30 through suitable gear box 32 and chains 34, 35, 36, 37 and 38, and associated sprockets which have proper diameters, i.e., speed ratios, to assure the desired proportions of solid material, juice and syrup.

The speed of the motor 30 is controlled by conventional motor speed control 40 which, in turn, is controlled through a selsyn system involving the selsyn elements 42 and 43, in accordance with the position of the float 27. When, of course, the float 27 is stationary at a predetermined level which corresponds to a condition where no material flows out of the kettle 25, the speed of the motor 30 is reduced to zero to thereby interrupt all flow of solid material, juice and syrup to the consistency regulator tank 15.

The filled cans, after being lidded by the can closing machine 29, i.e., lidder, are transferred to a can washer and sterilizer 46 which serves two purposes, namely, first, to wash the cans, and, second, to sterilize the cans using a water bath of 212° F. for approximately thirty seconds. The primary function of the washer and sterilizer 46 is to sterilize the inside seams and laps of the container by penetration of heat from the outside 212° F. water bath.

The cans, after leaving the washer and sterilizer 46, are subjected to two successive stages of cooling, first, in the cooler 48 and then in the cooler 49. The cooler 48 is supplied with cooling water of approximately 75° F. and is of larger capacity than the succeeding cooler 49 which is supplied with water of approximately 33° F., the water leaving at approximately 37° F. and being circulated through evaporator plates 50 associated with a refrigerating system 52.

The cooler 48 has a can capacity of 638 while the other cooler 49 has a 308 can capacity.

In accordance with prior practice, it is usual to cool the cans by exposing them to free moving air for approximately twenty-four hours before stacking or casing, or sometimes a combination of preliminary water cooling and air cooling is used. Such prior art methods result in double handling of the cans and produce a product that often times has the appearance of being overcooked. It is readily appreciated that such a product held at elevated temperatures for as long as twenty-four hours darkens in color and acquires an objectionable aged flavor.

In accordance with the present arrangement, a holding conveyor 54 is provided in combination with the other cooling means to provide time for a can to stop "sweating" before it is dried. At the instant a can leaves the chilled water cooler 49, the extreme outside of the container has a temperature of approximately 35° F. while the center of the container is approximately 135° F., giving an average temperature of approximately 95° F. The cold exterior of the can causes moisture from the surrounding air to condense on the can until such time that the exterior temperature of the can is raised above the dew-point temperature. Since the dew-point temperature varies with the atmospheric temperature and relative humidity, the temperature at which the container stops sweating is dependent upon these factors.

It has been found that in ten to fifteen minutes under normal conditions, the can stops sweating, i.e., noticeable condensation ceases; but to take care of exceptional humid days, twenty to thirty minutes are allowed for a can to remain on the holding conveyor 54 before it is subjected to the can drier 55 which provides an air blast for drying the cans in their passage therethrough before being transferred to the can palletizer 56. The cans, of No. 10 size enter the palletizer 56 at the rate of twenty per minute, cooled to a temperature of approximately 90° F.

The pumps 19 and 22 are identical 2½" size pumps, the pump 19 normally rotating between the limits of 34 to 68 r.p.m. while the pump 22 normally runs at a speed between the limits of 57 to 114 r.p.m. The pump 21 is a 1½" pump normally running between the limits of 162 to 324 r.p.m.

The motor 30 normally runs within the speed limits of 198 to 396 r.p.m., and the control 40 may be of the hydraulic type which provides variable speed control of the motor 30.

It is noted that the holding kettle 25 is provided with an agitator, and the mixture at approximately 200° F. is maintained therein for approximately a three minute sterilizing time.

Preferably, the crushed pineapple supplied to the conveyor 10 is preheated to facilitate eventual drainage of the juice in the revolving screen 11.

It is noted that the steam jacketed screw-type heating conveyor 10 is preferred for heavy drained weight crushed pineapple and may or may not be used as desired for regular drained weight or grocery crushed pineapple.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a comestible handling system of the character described for handling comestibles which consist of solid material and juice, means separating said solid material from said juice, first storage means for said solid material, second storage means for said juice, a mixing vessel receiving both solid material and juice from respectively said first and second storage means and for producing a consistent mixture of said juice and solid material, a mixture reservoir receiving said mixture from said vessel, means controlling the flow of solid material from said first storage means to said vessel, means controlling the rate of flow of said mixture from said vessel to said reservoir, means automatically responsive to the amount of mixture in said reservoir for controlling the first and second-mentioned controlling means.

2. In a system of the character described for handling a comestible of the type consisting of juice and solid material, first means separating said juice from said solid material, means in communication with said first means for combining said material and said juice in controlled amounts to provide a mixture of the same, metering means between said first means and said combining means for controlling the flow of juices and solid material to said combining means, a mixture receiving kettle in communication with said combining means, and float operated means associated with said kettle for controlling said metering means.

3. In a system of the character described for handling a comestible which consists of juice and solid material, means preheating said comestible to facilitate the separation of juice and solid material, means receiving the comestible from the last-mentioned means for separating the juice from said solid material, first storage means receiving said solid material, second storage means receiving said juice, mixing means receiving said solid material and said juice from respectively said first and second storage means and functioning to provide a uniform mixture of the juice and solid material, first pump means controlling the flow of solid material from said first storage means to said receiving means, a mixture reservoir receiving said mixture from said mixing means, second pump means controlling the flow of mixture from said mixing means to said reservoir, and means operated in response to the amount of mixture in said reservoir for jointly controlling the operation of the first and second-mentioned pump means.

4. An arrangement as set forth in claim 3 in which heat exchange means is provided to heat the mixture in its flow from said mixing means to said reservoir.

5. In a system of the character described for handling a comestible which consists of solid material and juice, means separating said solid material from said juice, a first reservoir for receiving said solid material, a second reservoir for receiving said juice, a vessel in communication with said first and second reservoirs, means controlling the consistency of the mixture of said juice and said solid material in said vessel, a third reservoir receiving said mixture from said vessel, means controlling the flow of mixture from said vessel to said third reservoir, and liquid level determining means associated with said third reservoir for controlling the first and second-mentioned controlling means.

6. In a comestible handling system of the character described, a screw-type heating conveyor for conveying a comestible, a screen receiving said comestible from said conveyor and functioning to separate juice from solid material of said comestible, a juice tank receiving said juice, a storage tank receiving said solid material, a syrup tank containing syrup, a common mixing vessel receiving said juice, solid material and said syrup to prepare a consistent mixture of the same, a holding kettle receiving said mixture, first pump means controlling the flow of solid material from said storage tank to said vessel, second pump means controlling the flow of syrup from said syrup tank to said vessel, third pump means controlling the flow of mixture from said vessel to said kettle, means driving said first, second and third pump in synchronism, and float operated means associated with said kettle for controlling the last mentioned means.

7. In a comestible handling system of the character described, a screen receiving the comestible and functioning to separate juice from solid material of said comestible, a juice tank receiving said juice, a storage tank receiving said solid material, a syrup tank containing syrup, a common mixing vessel receiving said juice, solid material and said syrup to prepare a consistent mixture of the same, a holding kettle receiving said mixture, first pump means controlling the flow of solid material from said storage tank to said vessel, second pump means controlling the flow of syrup from said syrup tank to said vessel, third pump means controlling the flow of mixture from said vessel to said kettle, means driving said first, second and third pump in synchronism, and float operated means associated with said kettle for controlling the last mentioned means.

References Cited in the file of this patent

UNITED STATES PATENTS

| | | |
|---|---|---|
| 2,253,383 | Lloyd et al. | Aug. 19, 1941 |
| 2,498,836 | Cross | Feb. 28, 1950 |
| 2,510,679 | Bruce | June 6, 1950 |
| 2,665,628 | Boileau et al. | Jan. 12, 1954 |
| 2,677,248 | Rexford et al. | May 9, 1954 |